United States Patent [19]

Factor

[11] Patent Number: 4,867,306
[45] Date of Patent: Sep. 19, 1989

[54] COMPACT DISC STORAGE RACK

[76] Inventor: Charles J. Factor, 36 Shippee Ave., West Warwick, R.I. 02893

[21] Appl. No.: 138,218

[22] Filed: Dec. 28, 1987

[51] Int. Cl.⁴ .............................................. A47F 7/00
[52] U.S. Cl. ................................ 206/309; 206/45.18; 211/40; 211/169
[58] Field of Search .................... 211/40, 169, 116, 55, 211/50, 41; 40/124.2, 124; 206/45.14, 45.18, 309

[56] References Cited

U.S. PATENT DOCUMENTS

| | | | |
|---|---|---|---|
| 1,381,525 | 6/1921 | Wagoner et al. | 211/40 |
| 3,181,706 | 5/1965 | Mandel | 211/169 X |
| 3,337,059 | 8/1967 | Le Hoy | 211/169 X |
| 3,391,796 | 7/1968 | Cross | 211/169 |
| 3,924,749 | 12/1975 | Weston | 211/169 X |
| 3,982,633 | 9/1976 | Pennington | 211/40 X |
| 4,462,498 | 7/1984 | Walker, Jr. | 211/40 |

FOREIGN PATENT DOCUMENTS 154771  12/1920  United Kingdom .................. 211/40

Primary Examiner—Ramon S. Britts
Assistant Examiner—Karen J. Chotkowski
Attorney, Agent, or Firm—Barlow & Barlow Ltd.

[57] ABSTRACT

A compact disc rack assembly has a series of pivotally mounted panels positioned on a stationary support. The panels have a plurality of spaced ledges with outer lips, and the ledges are spaced from each other less than the overall dimension of the container being housed so that the container is stored at a slight angle to the panel and gripped by the lips of the ledge holding the container.

3 Claims, 1 Drawing Sheet

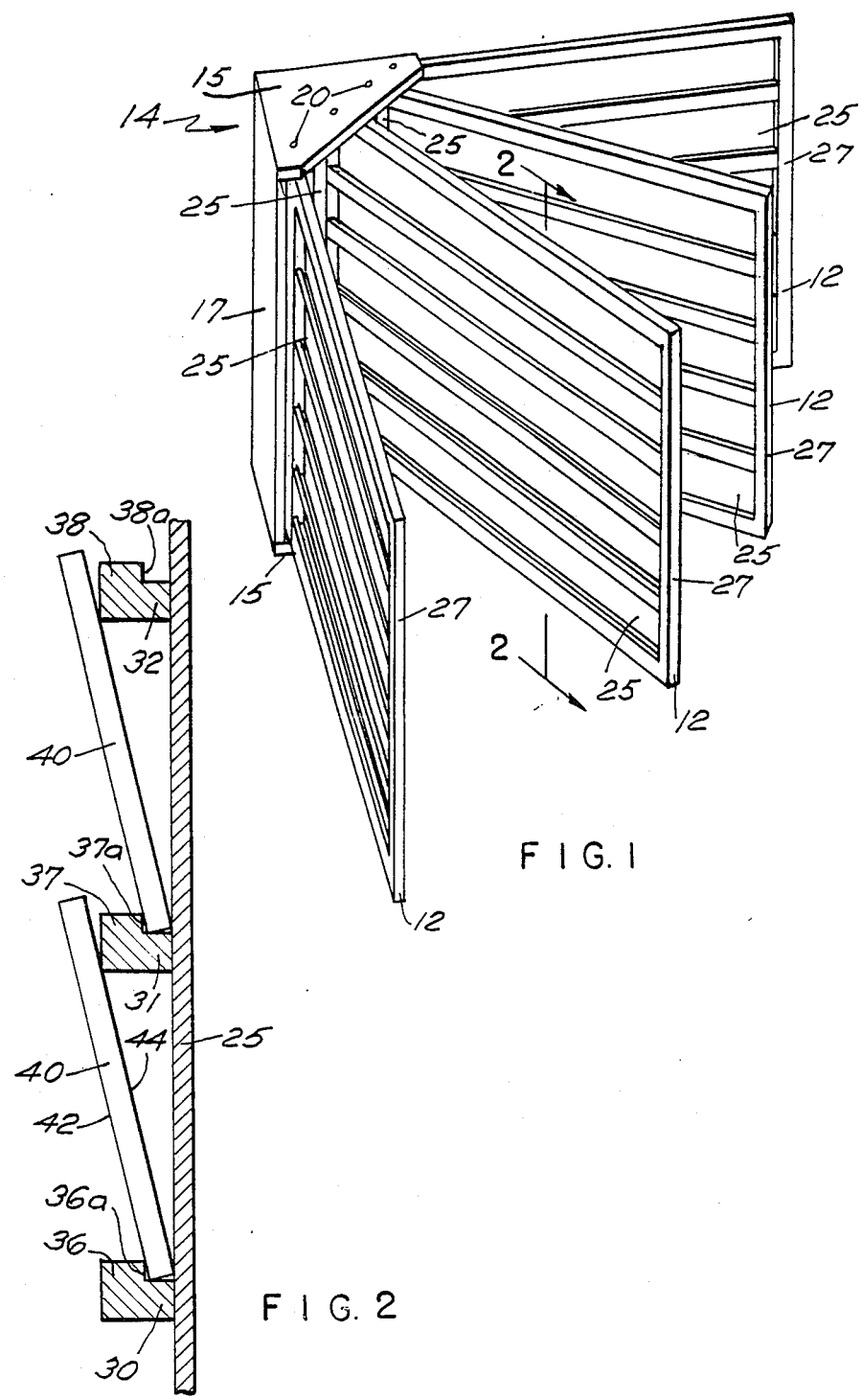

COMPACT DISC STORAGE RACK

BACKGROUND OF THE INVENTION

This invention relates to a storage rack for compact discs. Compact discs are different than the standard phonograph record albums since these discs are held within rigid containers that have a finite thickness much greater than that of a phonograph record. There is no convenient way to find one disc in a collection since the title of the work and the artist is displayed on a face panel of the container. It is advantageous, therefore, to have an accessible storage means available and particularly one which might mount readily upon a wall. In the prior art, the closest approach to this system is seen in the Walker U.S. Pat. No. 4,462,498 (211-40). In this patent, a rack for holding a conventional record album is disclosed and the albums are retained in position by a cord or the like which differs from the approach made by the instant invention where friction is utilized to grip the container of the disc, something that could not be accomplished with the standard form of record.

SUMMARY OF THE INVENTION

The invention provides a plurality of compact disc rack panels that are secured to a support means by pivotally mounting the panels to the support means in leaf like fashion. Each of the panels has a plurality of ledges that are spaced vertically apart from each other less than the dimension of the container of a compact disc. Each of the ledges also has a lip thereon and is spaced from the panel substantially the same distance as the thickness of the compact disc container so as to frictionally grip the container. Since the ledges are spaced apart less than the dimension of the container, the next adjacent ledge and lip tensions the disc container against the inner edge of the lip juxtaposed to the ledge on which the container rests. The compact disc rack assembly is designed to be hung against a wall and the various panels may be flipped like the pages of a book to acquire the proper album and yet the entire assembly takes little space.

BRIEF DESCRIPTION OF THE DRAWINGS

FIG. 1 is perspective view as seen from the front of the compact disc rack assembly made in accordance with the invention; and FIG. 2 is a vertical sectional view taken on line 2—2 of FIG. 1.

DESCRIPTION OF PREFERRED EMBODIMENT

It will be seen that the compact disc rack assembly has a series of pivotally mounted panels 12 which are mounted on a stationary wall hanger or support means 14. The support means can be attached to any wall surface and is illustrated as being in the form of a right triangle although other shapes may achieve identical results and, essentially, the hanger or support can take a variety of forms and therefore be constructed to hold as few or as many panels as needed, each of the panels being swingably mounted in the support means 14.

The support 14 essentially consists of a pair of horizontal plate members 15, only one being viewable and these horizontal plate members are fastened to vertical structural members 17. On the plate members 15, there are a plurality of holes 20 spaced from each other with a likewise mirror image of holes in the lower member (not shown). To mount one of the panels 12 in the support means 14, the panel is provided with a pin at the upper and lower edge thereof so that in effect each of the panels hinges on the pin.

The panels 12 are constructed of a planar backing panel 25 and to create rigidity and structural integrity, the planar panels 25 have border stiffening members such as 27 on all four edges thereof. Each of the panels has fastened to the face thereof spaced ledges such as 30, 31, 32, for example. Each of the ledges have frontal lips thereon such as the lips 36, 37, 38, respectively as seen in FIG. 2 and the inner edge of these lips such as the inner edges 36a, 37a, and 38a spaced a particular distance from the panel 25.

There is illustrated in FIG. 2 on a large scale from that appearing in FIG. 1, the manner in which the device of the present invention operates. Compact discs are encased in a rigid container which, as seen in FIG. 2, has finite thickness, each of the containers being designated by the reference numeral 40. The containers have substantially planar front and rear surfaces 42, 44 respectively that are joined by edges to create thickness to the package. The distance between the inner edge of the lips and the panel 25 are substantially identical to the thickness of each of the compact disc containers. In effect, therefore, when each of the discs is slipped in for storage and on to the ledge, the spacing of the adjacent ledge is such that the compact disc container is angled. In this fashion, pressure is exerted by the inner edge of the lip as the outer edge of an adjacent lip forces the container away from the planar panel 25. This provides a gripping action to the disc container and prevents the same from being dislodged. In addition, it will be apparent that each of the discs as stored on the rack assembly will be visible. Furthermore, each of the discs do not extend outwardly for any substantial distance beyond the panel and thus a very compact and space efficient storage device is provided which is well adapted to serve the purpose for which the rack has been designed.

I claim:

1. In combination, a plurality of rigid compact disc record containers and a rack assembly holding said plurality of compact disc containers, each container having substantially rigid planar front and rear surfaces with oppositely disposed edges that space the surfaces apart a finite thickness, said rack assembly having a planar panel, axially spaced ledges, said ledges having outer lips and extending at right angles from said planar panel, said ledges spaced apart less than the dimension between the said oppositely disposed edges of the said containers and the lips being spaced from the planar panel substantially the distance defined by the thickness of one of the said containers, each ledge and the outer lip thereon serving as the only support and as the sole retaining means for the containers in the rack, each of said lips being upwardly directed at right angles from said respective ledge, the upper inner edge of each lip defining a right angled corner which bears against the disc container associated therewith, whereby each disc container is tensioned by said upper inner edge of the lip and pressed against the outer edge of the next adjacent lip to frictionally grip the disc container in the rack assembly.

2. A compact disc rack assembly as in claim 1 including a support and wherein means are attached to the edges of said panel to hinge the panel to said support.

3. A compact disc rack assembly as in claim 1 wherein support means are provided for each panel, said support means comprising a pair of vertically spaced horizontal plate members each having a plurality of apertures therein, each panel having a dowel pin extending on a common line pivotal axis from opposite edges of said panel, each plate member having apertures therein, said dowel pins engaging said apertures.

* * * * *